United States Patent [19]

Benton et al.

[11] Patent Number: 4,577,008
[45] Date of Patent: Mar. 18, 1986

[54] PROCESS FOR THE PRODUCTION OF ACRYLONITRILE-PROPYLENE COPOLYMERS

[75] Inventors: Kenneth C. Benton, Macedonia; James L. O'Kane, Northfield, both of Ohio

[73] Assignee: The Standard Oil Company, Cleveland, Ohio

[21] Appl. No.: 625,168

[22] Filed: Jun. 27, 1984

[51] Int. Cl.$^4$ ........................ C08F 220/44; C08F 2/18; C08F 2/22
[52] U.S. Cl. .................................................... 526/342
[58] Field of Search ........................................ 526/342

[56] References Cited

U.S. PATENT DOCUMENTS

| | | | |
|---|---|---|---|
| 3,926,926 | 12/1975 | Li et al. | 526/267 |
| 4,107,418 | 8/1978 | Yatsu et al. | 526/342 |
| 4,195,135 | 3/1980 | Li et al. | 525/64 |
| 4,388,452 | 6/1983 | Noimon et al. | 526/342 |

FOREIGN PATENT DOCUMENTS 1056236  1/1967  United Kingdom ................ 526/342

OTHER PUBLICATIONS

Polymer Letters vol. 5, pp. 47–55, (1967).

Primary Examiner—Joseph L. Schofer
Assistant Examiner—Peter F. Kulkosky
Attorney, Agent, or Firm—David P. Yusko; John E. Miller; Larry W. Evans

[57] ABSTRACT

Copolymers of acrylonitrile and propylene are produced by the process of the instant invention. This process comprises polymerizing (1) a major portion of an olefinically unsaturated nitrile monomer with (2) a minor portion of propylene, in the presence of a free radical initiator, while maintaining the molar ratio of propylene to the olefinically unsaturated nitrile during polymerization at a ratio greater than the molar ratio of propylene to the olefinically unsaturated nitrile in the final polymer.

18 Claims, No Drawings

PROCESS FOR THE PRODUCTION OF ACRYLONITRILE-PROPYLENE COPOLYMERS

BACKGROUND OF THE INVENTION

1. Field of the Invention

This invention relates to acrylonitrile-propylene copolymers. More specifically, this invention relates to a process for producing acrylonitrile-propylene copolymers that contain a major portion of polymerized acrylonitrile. This process is further characterized as employing a free radical generating polymerization initiator.

2. Description of the Prior Art

Free radical polymerization is a means of chain growth polymerization which employs as an initiator or intermediate a molecular fragment having one or more unpaired electrons. These molecular fragments are usually short lived and highly reactive. In free radical polymerization chain growth results when the radicals attack and react with a substrate and the radicals lost by this reaction are regenerated for further attack, reaction and combination with additional substrates.

The instant invention pertains to copolymers of acrylonitrile and propylene. Copolymers of acrylonitrile and various olefins are known in the art. For example, U.S. Pat. No. 3,227,697 teaches the preparation of acrylonitrile-ethylene copolymers and U.S. Pat. No. 3,652,731 describes copolymers of acrylonitrile with isobutylene. Typically, such copolymers are produced by mechanisms other than free radical polymerization. Copolymers produced by free radical techniques, typically do not contain ethylene or propylene because these monomers are much less reactive in free radical polymerization than the larger olefins.

A means for copolymerizing acrylonitrile and ethylene by free radical polymerization techniques has been developed. U.S. Pat. No. 3,791,603 describes the polymerization of ethylene with numerous comonomers including acrylonitrile using a free radical-forming polymerization catalyst. However, until the instant invention, techniques for an acrylonitrile-propylene copolymer by a free radical mechanism remained unknown.

An object of the instant invention is to provide a process for the polymerization of acrylonitrile and propylene using a free radical mechanism.

It is a further object of the instant invention to produce acrylonitrile-propylene polymers containing a major proportion of acrylonitrile by such a process.

SUMMARY OF THE INVENTION

A thermoplastic polymeric composition resulting from the polymerization in the presence of a free radical initiator (A) a major portion of olefinically unsaturated nitrile monomers, and (B) a minor portion of propylene wherein the molar ratio of the propylene to the olefinically unsaturated nitrile during polymerization is maintained at a ratio greater than the molar ratio of propylene to the olefinically unsaturated nitrile in the final polymeric composition.

DETAILED DESCRIPTION OF THE INVENTION

Random copolymers of an olefinically unsaturated nitrile and propylene, containing a major proportion by weight of the nitrile are prepared by free radical polymerization at moderate pressures. Preferably these copolymers contain 65 to 95 percent by weight of the nitrile and more preferably these copolymers contain 75 to 85 percent by weight of the nitrile.

The olefinically unsaturated nitriles suitable for the present invention include the alpha,beta-unsaturated mononitriles of the formula:

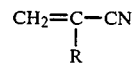

where R is hydrogen, a lower alkyl group having from 1 to 4 carbon atoms or a halogen. Such compounds include acrylonitrile, alpha-chloro acrylonitrile, alpha-flouro acrylonitrile, methacrylonitrile, ethylacrylonitrile and the like. The most preferred olefinically unsaturated nitriles for the present invention are acrylonitrile, methacrylonitrile and mixtures thereof.

The process of the present invention is unique in that it produces copolymers of olefinically unsaturated nitriles and propylene. However, equally suited for polymerization with the olefinically unsaturated nitriles by the process of the instant invention are other alpha-olefins such as ethylene, butylene, isobutylene and the like.

The polymerization of an olefinically-unsaturated nitrile and propylene to produce a random copolymer containing a major portion of the nitrile is achieved through the proper control of the comonomer ratios during the copolymerization reaction. Specifically, the molar ratio of the propylene monomer to the nitrile monomer in the reaction is maintained at a ratio greater than the molar ratio of propylene to the olefinically-unsaturated nitrile in the final copolymer. For example, the preferred level of propylene in the final copolymer is between 5 to 35 mole percent and more preferably 15–25 mole percent; in order achieve these compositions when using a continuous nitrile addition method in emulsion or suspension polymerization, it is preferred to begin the reaction with a propylene:nitrile molar ratio of between 3:1 and 6:1 in the reactor and to add the nitrile during the course of the polymerization such that the final propylene:nitrile molar ratio (unreacted) in the reactor is in the range of about 1:1 to 1.5:1. The actual comonomer ratios employed will vary depending upon the desired copolymer composition, whether batch or continuous monomer addition methods are utilized, and the solubility of the monomers in the polymerization system.

In a typical polymerization, olefinically unsaturated nitrile-propylene copolymers containing a major portion of the nitrile are produced when the propylene to nitrile molar ratio is in excess of 1:1. Preferably, the propylene to nitrile molar ratio at the start of polymerization is in excess of 1.1:1. More preferably this ratio is in excess of 2:1. Most preferably the propylene to nitrile molar ratio at the start of polymerization is between 3:1 and 5:1. However, in all cases by the end of the polymerization reaction, the molar ratio of propylene to the nitrile may be allowed to drop as low as 1:1.

A catalyst, i.e. a free radical initiator, is required for a satisfactory polymerization rate. The catalyst may be any of those commonly employed for the polymerization of nitriles with other monovinyl monomers including the azo initiators such as azobisisobutyronitrile, the various peroxygen compounds such as hydrogen peroxide, benzoyl peroxide, pelargonyl peroxide, cumene hydroperoxide, tertiary butyl hydroperoxide, tertiary butyl diperphthalate, tertiary butyl perbenzoate and others such as those disclosed in U.S. Pat. Nos. 2,471,959 and 2,491,471. The azonitrile compounds are preferred.

Also useful as polymerization initiators are the sodium, potassium and ammonium persulfates, the water-soluble oxidation-reduction or "redox" types of catalysts and the heavy metal activated, water-soluble peroxygen and redox catalysts. Included in this list are the water-soluble persulfates; the combination of one of the water-soluble peroxygen compounds such as potassium persulfate with a reducing substance such as a polyhydroxy phenol, an oxidizable sulphur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a dimercapto compound and a water-soluble ferricyanide compound and others. Heavy metal ions which greatly activate potassium persulfate and the redox catalyzed polymerizations include those of iron, cobalt, and others. The preferred range of catalyst as above defined, is from about 0.01 to 5 parts by weight per one-hundred parts by weight of monomers.

The copolymerization of olefinically unsaturated nitriles and propylene may be conducted in batch or continuous flow processes in solution, suspension or emulsion systems. Suitable emulsifiers include fatty acid soaps such as sodium laurate; organic sulfates and sulfonates such as sodium lauryl sulfate; the alkali metal salts of sulfonated petroleum or paraffinic oils; the sodium salts of aromatic sulfonic acids, such as the sodium salts of naphthalene sulfonic acids; the sodium salts of dodecane-1-sulfonic acid, octadecane-1-sulfonic acid, etc.; aralkyl sulfonates such as sodium isopropyl benzene sulfonate, sodium isobutyl naphthalene sulfonate, and alkali metal salts of polymerized alkyl naphthalene sulfonic acids; alkali metal and ammonium salts of polymerized alkyl naphthalene sulfonic acids; alkali metal and ammonium salts of sulfonated dicarboxylic acid esters and amides such as sodium dodecyl sulfosuccinate, sodium N-octadecyl sulfosuccinamate; the polyalkyl and polyalkaryl alkoxyalkylene phosphonate acids and salts more fully described in U.S. Pat. No. 2,853,471; the so-called cationic emulsifiers such as the salts of strong inorganic acids and organic bases containing long carbon chains, for instance, lauryl amine hydrochloride, the hydrochloride of diethylaminoethyl decylamine, trimethyl cetyl ammonium bromide, dodecyl trimethyl ammonium bromide, the diethyl cyclohexylamine salt of cetyl sulfonic ester and others may be used.

In addition to the above and other polar or ionic emulsifiers, still other materials which may be used, singly or in combination with one or more of the above types of emulsifiers include the so-called "nonionic" emulsifiers such as the polyether alcohols prepared by condensing ethylene or propylene oxide with higher alcohols, the fatty alkylamine condensates, the diglycol esters of lauric, oleic and stearic acids, and others. It is often desirable to add post-polymerization emulsifiers to the latices embodied herein for improved stability.

Although the polymerization may be carried out in the presence of air, the rate of reaction is ordinarily faster in the absence of oxygen and hence, the polymerization in an evacuated vessel, at reflux, or under an inert atmosphere such as nitrogen is preferred. The polymerization is performed at conventional temperatures of approximately 40° to 85° C., preferably approximately 60° to 70° C. The pressure at the beginning of polymerization depends upon the solubility of the propylene in the polymerization system and the polymerization temperature. For example, in solution polymerization at approximately 60° C., the pressure may range from approximately 1 to approximately 6 atmospheres, while in suspension and emulsion polymerizations, the pressure may range as high as approximately 30 to approximately 50 atmospheres. Although the pH of the polymerization system is not critical, it is preferred that a pH of about 6 be employed during the polymerization reaction. The polymer latex resulting from emulsion systems may be adjusted to any desired pH.

In batch polymerization processes, one or more of the components, i.e., monomers, catalyst, activator, emulsifier, etc. may be added incrementally or continuously during the polymerization reaction. Typically in a batch polymerization process, continuous monomer addition is preferred, with the more active nitrile being added to the reactor to maintain the desired ratio of propylene to the nitrile. Continuous nitrile addition permits the more efficient utilization of the nitrile and the preparation of a more homogeneous product.

SPECIFIC EMBODIMENTS

In order to better illustrate the instant invention the following examples are provided.

EXAMPLE 1

Acrylonitrile/Propylene Solution Copolymerization

Clear, dry 8 oz. round screw cap bottles were charged with 50–100 ml. of solvent and purged for 10–15 minutes with nitrogen. The initiator, acrylonitrile, and a slight excess of liquid propylene were added. The excess propylene was allowed to evaporate until the desired weight was attained, and the bottles were then tightly capped and placed in a rotating constant temperature water bath for several hours. The unreacted propylene was then vented and the products were recovered by vacuum filtration. The polymers were dried at 50° C. under reduced pressure for 24–48 hours.

Table I illustrates the results of several solution polymerizations for acrylonitrile and propylene in various solvents with selected initiators. The physical properties of several copolymers prepared in this manner are shown in Table II.

EXAMPLE 2

Acrylonitrile/Propylene Suspension Copolymerization

Distilled water was boiled to expel oxygen and the cooled to ambient temperature under a nitrogen sparge. While the water was still warm, a suspending aid was dissolved in the water. The cool water/suspending aid solution was then charged to a stainless steel pressure reactor, followed by about 30 wt. percent of the total acrylonitrile polymerized and polymerization modifiers. The reactor was then purged with nitrogen by pressurizing the reactor to approximately 100–200 psig and then exhausting the nitrogen several times. A nominal 10 psig nitrogen pressure was left in the reactor.

Propylene in amounts shown in Table III was transferred to the reactor from a sample bomb. The exact weight of the propylene was determined by the difference in weight of the sample cylinder before and after the transfer.

The initiator was dissolved in a small amount of a solvent, e.g., ethyl acetate, in a steel cylinder. The cylinder was pressurized to slightly above the reactor pressure with nitrogen, connected to the inlet valve of the reactor, and the initiator solution was then forced into the reactor. The reactor was then heated to the desired polymerization temperature.

The remainder of the acrylonitrile, and optional additional polymerization modifiers were pumped into the reactor at a rate of approximately 0.3 to 0.9 mole/hour. At the end of the monomer addition, the reactor was cooled to ambient temperature and the excess propylene vented. The polymer was recovered from the suspension by filtration, washed with methanol, and dried under reduced pressure at 50°-60° C. for at least 16 hours.

The results of several suspension copolymerizations are shown in Table III. Typical physical properties of such copolymers are given in Table IV.

EXAMPLE 3

Acrylonitrile/Propylene Emulsion Copolymerization

Acrylonitrile/propylene emulsion copolymerizations are performed according to the procedure of Example 2, except that typical emulsifiers are used in place of the high molecular weight polymeric suspending aids. The resulting system is a latex, from which the copolymer product may be recovered by the standard coagulation methods known in the art, e.g., by diluting the latex with acidified alcohol, etc.

The results of several acrylonitrile/propylene emulsion copolymerizations are illustrated in Table V. The physical properties and optical properties of several of these polymers are listed in Tables VI and VII, respectively.

EXAMPLE 4

An acrylonitrile/propylene copolymer prepared according to Example 3 (13 mole percent propylene), 50 g., and 0.5 g. of dioctylphthalate were added over a period of 2 min. to the mixing chamber of Brabender Plasti-Corder. The components were mixed for 7 minutes at 230° C. and 35 rpm. A 3.8 mil. film was compression molded from this compound and tested for gas permeation, with the following result:

Oxygen Transmission Rate: 0.087-0.099 cc./mil 100 in$^2$ 24 hr. atmosphere.

Water Vapor Transmission Rate: 2.1-1.9 g./mil. 100 in$^2$ 24 hr. atmosphere

Although only a few embodiments of this invention have been described above, it is to be appreciated that many additions or modifications can be made without departing from the spirit and scope of the invention. These and all other modifications are intended to be included within the scope of this invention, which is to be limited only be the following claims.

TABLE I

Acrylonitrile/Propylene Solution Copolymerization

| Exper. No. | $C_3^=$/AN Mole Ratio | Solvent | Initiator[1] | T, °C. | % Yield[2] | Mole % $C_3^=$ in copolymer |
|---|---|---|---|---|---|---|
| 1 | 2.6 | Cyclohexane | 2,4-DMVN | 55 | 25 | 16 |
| 2 | 2.6 | Cyclohexane | t-BPP | 55 | 12 | 13 |
| 3 | 2.6 | Cyclohexane | BPO | 55 | 7 | 11 |
| 4 | 2.6 | Cyclohexane | t-BPO | 55 | 3 | 10 |
| 5 | 2.6 | Cyclohexane | t-BCP | 40 | 18 | 12 |
| 6 | 2.6 | Cyclohexane | n-PP | 40 | 18 | 11 |
| 7 | 1.0 | Benzene | 2,4-DMVN | 47 | 15 | 19 |
| 8 | 1.0 | n-Heptane | 2,4-DMVN | 55 | 49 | 11 |
| 9 | 2.6 | n-Heptane | 2,4-DMVN | 55 | 18 | 15 |
| 10 | 1.0 | Methyl Formate | 2,4-DMVN | 55 | 14 | 34 |
| 11 | 1.0 | t-Butyl Alcohol | 2,4-DMVN | 55 | 28 | 21 |
| 12 | 1.0 | t-Butyl Alcohol | t-BCP | 40 | 35 | 18 |
| 13 | 1.0 | 70/30 i-propyl Alcohol/n-Heptane | 2,4-DMVN | 47 | 18 | 24 |

[1] 2,4-DMVN = 2,2'-Azobis-(2,4-Dimethylvaleronitrile)
t-BPP = t-Butyl Peroxypivalate
BPO = Benzoyl Peroxide
t-BPO = t-Butyl Peroctoate
t-BCP = 4,4'-Bis(t-Butylcyclohexyl) Peroxydicarbonate
n-PP = n-Propyl Peroxydicarbonate
[2] Based on total monomer charge.

TABLE II

Physical Properties of Several Acrylonitrile/Propylene Solution Copolymers

| Preparation Solvent | Mole % $C_3$ in Copolymer | $\overline{M}w \times 10^{-4}$ | HDT (°C.) | Flex. Strength (psi × $10^{-3}$) | Flex Modulus (psi × $10^{-5}$) | Brabender Torque (m.g. @ T °C., t min.) |
|---|---|---|---|---|---|---|
| Cyclohexane | 23 | 7.3 | 63 | 3.43 | 4.49 | 1500/206° C./15 min. |
| t-Butyl Alcohol | 17 | 8.8 | 70 | 6.24 | 5.53 | 3470/210° C./15 min. |
| t-Butyl Alcohol | 19 | 9.7 | 66 | 5.36 | 5.39 | 2720/205° C./12 min. |
| t-Butyl alcohol | 23 | 6.5 | — | — | — | 710/200° C./15 min. |

TABLE III

Acrylonitrile/Propylene Suspension Copolymerizations

| Exper. No. | Suspending Aid[1] (pph AN) | Water (pph AN) | Modifier[2] (pph AN) | $C_3$:AN Mole Charge Ratio | AN Feed Rate mole/Hr | Initiator[3] (pph AN) | Yield[4] (%) | Prefloc[5] (%) |
|---|---|---|---|---|---|---|---|---|
| 1 | 0.25 HEC | 267 | — | 4.0 | 0.45 | 0.5 2,4-DMVN | | |
| 2 | 0.25 HEC | 267 | 0.75 LDM | 3.9 | 0.34 | 0.5 AIBN + | 26 | 2 |

TABLE III-continued

Acrylonitrile/Propylene Suspension Copolymerizations

| Exper. No. | Suspending Aid[1] (pph AN) | Water (pph AN) | Modifier[2] (pph AN) | C$_3$:AN Mole Charge Ratio | AN Feed Rate mole/Hr | Initiator[3] (pph AN) | Yield[4] (%) | Prefloc[5] (%) |
|---|---|---|---|---|---|---|---|---|
| 3 | 0.05 HEC | 200 | 1.0 LDM | 3.3 | 0.43 | 0.5 2,4-DMVN 0.45 AIBN + 0.45 2,4-DMVN | 21 | 7 |
| 4 | 0.05 HEC | 200 | 0.5 BrCCl$_3$ | 3.3 | 0.51 | 0.45 AIBN + 0.45 2,4-DMVN | 27 | 0 |
| 5 | 0.02 HEC | 500 | 0.6 LDM | 5.9 | 0.35 | 0.45 AIBN + 0.45 2,4-DMVN | 25 | 5 |
| 6 | 0.1 HEC | 200 | 2.0 LDM | 2.1 | 0.74 | 0.5 AIBN + 0.5 2,4-DMVN | 22 | 7 |
| 7 | 0.1 PVPK90 | 300 | — | 3.2 | 0.30 | 0.45 AIBN + 0.45 2,4-DMVN | 14 | 84 |
| 8 | 0.07 Copoly-44 | 200 | 0.5 LDM | 3.5 | 0.47 | 0.45 AIBN + 0.45 2,4-DMVN | 14 | 50 |

[1]pphAN = parts per 100 parts total Acrylonitrile Suspending Aids:
HEC = Hydroxyethyl Cellulose
PVP K-90 = Poly(N—vinyl-2-Pyrrolidone)
Copoly-44 = 95/5 w/w. N,N—Dimethylacrylamide/Lauryl Methacrylate Copolymer
[2]LDM = Limonene Dimercaptan
BrCCl$_3$ = Bromotrichloromethane
[3]AIBN = 2,2'-Azobis(2-Methylpropionitrile), DuPont Vazo ® 64
2,4-DMVN = 2,2'-Azobis(2,4-Dimethylvaleronitrile), DuPont Vazo ® 52
[4]% g. total Polymer/g. (AN + C$_3^=$)] × 100%
[5]% of Total Polymer

TABLE IV

Acrylonitrile/Propylene Emulsion copolymerizations

| Exper. No. | Mole % C$_3^=$ in Copolymer | AN Feed (mole/hr) | Modifier[1] (pph AN) | $\bar{M}w$ × 10$^{-5}$ | HDT (°C.) | Flex. Strength (psi × 10$^{-3}$) | Flex Mod. (psi × 10$^5$) | M.I.[2] (g./10$^1$) | Brabender Torque (6', 230° C., m-g) |
|---|---|---|---|---|---|---|---|---|---|
| 1 | 15 | — | — | 3.14 | 69 | 10.0 | 5.73 | — | 6000 |
| 2 | 13 | 0.45 | — | 2.70 | 67 | 5.1 | 4.79 | — | — |
| 3 | 19 | 0.34 | 0.75 LDM | — | 60 | 4.9 | 4.93 | — | 1160 |
| 4 | 19 | 0.43 | 1.0 LDM | — | 58 | 3.6 | 4.73 | 1.1 | 760 |
| 5 | 17 | 0.51 | 0.5 BrCCl$_3$ | — | 67 | 6.3 | 5.00 | 0 | 2600 |
| 6 | 18 | 0.47 | 1.2 LDM | 0.75 | 64 | 4.0 | 5.06 | 0.13 | — |
| 7 | 19 | 0.51 | 1.2 LDM | — | 56 | 2.9 | 5.10 | 1.4 | 520 |
| 8 | — | 0.83 | 1.75 LDM | 0.65 | 59 | 3.1 | 4.28 | 5.8 | — |

[1]LDM = Limonene Dimercaptan
BrCCl$_3$ = Bromotrichloromethane
[2]M.I. = Melt Index

TABLE V

Acrylonitrile/Propylene Emulsion Copolymerizations

| Exper. No.[1] | Surfactant[2] (pph AN) | Water (pph AN) | Modifier[3] (pph AN) | C$_3^=$ AN Mole Charge Ratio | AN Feed (mole/hr.) | Yield[4] (%) | Prefloc[5] (%) | Mole % C$_3^=$ in Copolymer |
|---|---|---|---|---|---|---|---|---|
| 1 | 2.7 RS710 | 480 | 0.35 LDM | 9.6 | 0.29 | 32 | 26 | 20 |
| 2 | 2.7 RS710 | 480 | 0.18 LDM | 5.6 | 0.30 | 45 | 29 | 19 |
| 3 | 3.0 RS710 | 200 | 0.35 LDM | 3.3 | 0.35 | 46 | 37 | 12 |
| 4 | 2.6 RS710 + 0.5 BC420 | 530 | 0.35 LDM | 8.2 | 0.37 | 30 | 15 | |
| 5 | 4.1 SF78 | 365 | — | 3.2 | 0.16 | 20 | 6 | 16 |
| 6 | 3.0 SF78 | 200 | — | 0.9 | — | — | 100 | — |
| 7 | 2.75 SF78 | 200 | 0.75 t-DDM | 3.6 | 0.5 | 16 | 19 | 17 |
| 8 | 3.0 SLS | 350 | — | 3.3 | 0.37 | 26 | 56 | — |
| 9 | 2.0 DOSS | 200 | — | 3.3 | 0.50 | 23 | 44 | — |

[1]All runs: 0.45 phAN Vazo ® 52 + 0.45 phAN Vazo ® 64 T = 60° C.
[2]RS-710 = GAF Gafac RS 710
BC-420 = GAF Emulphogene BC420
SF78 = Sodium n-Dodecylbenzene Sulfonate
SLS = Sodium Lauryl Sulfate
DOSS = Sodium Dioctylsulfosuccinate
[3]LDM = Limonene Dimercaptan
t-DDM = t-Dodecyl Mercaptan
[4][g. Total Polymer/(g.AN + g. C$_3^=$ Charged)] × 100%
[5]As Fraction of Total Polymer Recovered

TABLE VI

Physical Properties of Acrylonitrile/Propylene Emulsion Copolymers

| Exper. No. | Mole % C$_3^=$ in Copolymer | $\bar{M}w$ × 10$^{-5}$ | HDT (°C.) | Flex Strength (psi. × 10$^{-3}$) | Flex. Modulus (psi × 10$^{-5}$) | M.I. (g./10 min.) | Brabender Torque (mg./°C./min.) |
|---|---|---|---|---|---|---|---|
| 1 | 20 | 1.74 | 67 | 6.6 | 5.2 | 0 | 980/231/15 |
| 2 | 12 | 1.67 | 72 | 4.6 | 4.5 | 0 | 1600/230/15 |
| 3 | 10 | 1.34 | — | — | — | 12.4 | 575/230/15 |
| 4 | 16 | — | 71 | 3.7 | 4.3 | — | |

TABLE VI-continued

Physical Properties of Acrylonitrile/Propylene Emulsion Copolymers

| Exper. No. | Mole % $C_3^=$ in Copolymer | $\overline{M}w \times 10^{-5}$ | HDT (°C.) | Flex Strength (psi. $\times 10^{-3}$) | Flex. Modulus (psi. $\times 10^{-5}$) | M.I. (g./10 min.) | Brabender Torque (mg./°C./min.) |
|---|---|---|---|---|---|---|---|
| 5 | 17 | — | — | — | — | 1.8 | 1920/230/15 |
| 6 | 13 | 1.43 | 70 | 8.8 | 5.5 | 0 | 3700/235/15 |

TABLE VII

Optical Properties of Acrylonitrile/Propylene Emulsion Copolymers

| Experiment No. | Mole % $C_3^=$ in Copolymer | % Transmission[1] | % Haze | Yellowness Index[1] |
|---|---|---|---|---|
| 1 | 20 | 68 | 19 | 80 |
| 2 | 12 | 51 | 10 | 131 |
| 3 | 16 | 58 | 17 | 124 |
| 4 | 13 | 50 | 11 | 132 |

[1] Normalized to 140 mil sample thickness

The invention claimed is:

1. A thermoplastic polymeric composition resulting from the polymerization of
   (A) a major portion of olefinically unsaturated nitrile monomers, and
   (B) a minor portion of propylene
wherein the polymeric composition is a random copolymer comprising between 65 and 95 percent by weight of the polymerized olefinically unsaturated nitrile.

2. The polymeric composition of claim 1, wherein the polymeric composition comprises between 75 and 85 percent by weight of the polymerized olefinically unsaturated nitrile.

3. The polymeric composition of claim 1, wherein the olefinically unsaturated nitrile is an alpha-beta unsaturated mononitrile of the formula:

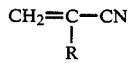

wherein R is selected from the group consisting of hydrogen, a lower alkyl.

4. The polymeric composition of claim 3 wherein the olefinically unsaturated nitrile is acrylonitrile or methacrylonitrile.

5. The polymeric composition of claim 1 wherein the composition results from the polymerization in the presence of a free radical initiator of
   (A) a major portion of olefinically unsaturated nitrile monomers and
   (B) a minor portion of propylene
wherein the molar ratio of the propylene monomer to the olefinically unsaturated nitrile monomer during polymerization is maintained at a ratio greater than the molar ratio of propylene to the olefinically unsaturated nitrile in the final polymeric composition, with the proviso that the ratio of the propylene monomer to the nitrile monomer is about 1:1 or greater.

6. A process for producing a thermoplastic polymeric composition comprising a random copolymer containing between 65 and 95 percent by weight of a polymerized olefinically unsaturated nitrile, and 5 to 35 percent by weight of polymrized propylene, the process consisting essentially of:
   (A) polymerizing at a temperature sufficient for polymerization and in the presence of a free radical initiator (1) a major portion of olefinically unsaturated nitrile monomers and (2) a minor portion of propylene; and
   (B) maintaining the molar ratio of the propylene to the olefinically unsaturated nitrile monomer during polymerization at a ratio greater than the molar ratio of propylene to the olefinically unsaturated nitrile in the final polymeric composition, with the proviso that the ratio of the propylene monomer to the nitrile monomer is about 1:1 or greater.

7. The process of claim 6 wherein the polymeric composition comprises between 75 and 85 percent by weight of the polymerized nitrile.

8. The process of claim 6 wherein the olefinically unsaturated nitrile monomers are alpha-beta-unsaturated mononitriles of the formula

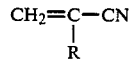

wherein R is selected from the group consisting of hydrogen, a lower alkyl group having from 1 to 4 carbon atoms and a halogen.

9. The process of claim 8 wherein the olefinically unsaturated nitrile monomers is acylonitrile or methacylonitrile.

10. The process of claim 6 wherein the molar ratio of propylene to olefinically unsaturated nitrile during polymerization is in excess of 1:1.

11. The process of claim 10 wherein the molar ratio at the start of polymerization is in excess of 1.1:1 and wherein the molar ratio at the end of polymerization is in excess of 1:1.

12. The process of claim 11 wherein the molar ratio at the start of polymerization is in excess of 2:1.

13. The process of claim 12 wherein the molar ratio at the start of polymerization is between 3:1 and 6:1.

14. The process of claim 6 wherein the process is conducted by solution, suspension or emulsion polymerization.

15. The process of claim 6 wherein the free radical initiator is an azo initiator or a peroxygen compound.

16. The process of claim 15 wherein the free radical initiator is azobisisobutyronitrile.

17. The process of claim 15 wherein the free radical initiator is selected from the group consisting of hydrogen peroxide, benozyl peroxide, pelargonyl peroxide, cumene hydroperoxide, tertiary butyl hydroperoxide, tertiary butyl diperphthalate and tertiary butyl perbenzoate.

18. The process of claim 6 wherein the amount of the free radical initiator present during the polymerization is from about 0.1 to about 5 parts by weight of the initiator per one-hundred parts by weight of the monomers.

* * * * *